United States Patent [19]

Ludwig

[11] 4,425,022
[45] Jan. 10, 1984

[54] ANTIREFLECTION COATING ON A SURFACE WITH HIGH REFLECTING POWER

[75] Inventor: Roland Ludwig, Bischoffen, Fed. Rep. of Germany

[73] Assignee: Ernst Leitz Wetzlar GmbH, Wetzlar, Fed. Rep. of Germany

[21] Appl. No.: 229,575
[22] PCT Filed: Mar. 17, 1980
[86] PCT No.: PCT/DE80/00031
  § 371 Date: Jan. 25, 1981
  § 102(e) Date: Jan. 23, 1981
[87] PCT Pub. No.: WO80/02749
  PCT Pub. Date: Dec. 11, 1980

[30] Foreign Application Priority Data

May 25, 1979 [DE] Fed. Rep. of Germany ....... 2921178

[51] Int. Cl.$^3$ .............................................. G02B 5/28
[52] U.S. Cl. .................................. 350/1.7; 350/164
[58] Field of Search ................. 350/1.7, 1.1, 164, 166

[56] References Cited

U.S. PATENT DOCUMENTS

| 2,519,722 | 8/1950 | Turner | 350/166 |
| 2,590,906 | 4/1952 | Tripp | 350/166 |
| 4,101,200 | 7/1978 | Daxinger | 350/166 |
| 4,180,954 | 1/1980 | Gell | 350/1.7 |

FOREIGN PATENT DOCUMENTS

| 2557543 | 7/1976 | Fed. Rep. of Germany . |
| 1373061 | 8/1964 | France . |
| 46-38377 | 11/1971 | Japan . |
| 52-113236 | 9/1977 | Japan . |

OTHER PUBLICATIONS

Sov. Journ. of Quantum Electronics, vol. 8, No. 2, Feb. 2, 1978, V. V. Apollonov et al., pp. 262-264.

Primary Examiner—Jon W. Henry
Attorney, Agent, or Firm—Schwartz, Jeffery, Schwaab, Mack, Blumenthal & Koch

[57] ABSTRACT

A reflection-reducing layer (S) between an incidence medium (E) and a highly reflecting surface (3) is described, wherein for the refractive index $n_1$ of the incidence medium (E) and the refractive index $n_2$ of the reflection-reducing layer (S) the relationship of $n_1 = n_2$ or at least $n_1 \simeq n_2$ is valid and the reflection-reducing layer (S) has an absorbtivity such that no reflecting radiation components are emerging from it in the direction of the incidence medium (E). The reflection-reducing layer (S), conveniently consisting of two partial layers, is preferably constructed so that the first partial layer consists of the same material as the incidence medium (E), for example, germanium, and the second partial layer of the same material as the highly reflecting surface (3), for example, chromium. A process for the preparation of a reflection-reducing layer (S) of this type is further disclosed, said process being characterized by the layer thickness controlled vapor deposition in a high vacuum, wherein conveniently the material or the mixture of materials is deposited simultaneously or successively by means of sputtering and the thickness of the layer is controlled during the vapor deposition or sputtering by means of an oscillator crystal.

12 Claims, 4 Drawing Figures

ANTIREFLECTION COATING ON A SURFACE WITH HIGH REFLECTING POWER

BACKGROUND OF THE INVENTION

The application concerns a reflection-reducing layer on highly reflecting surfaces and a process for the preparation of such layers.

It is known to prepare masks, diaphragms, slits, gratings or coding arrangements by applying them in the form of a thin, impermeable layer to a transparent carrier, for example, lenses or plane parallel plates. This is effected in most cases by vapor deposition in a high vacuum or by sputtering. Metals, particularly aluminum or chromium, have been found suitable as coating materials.

A disadvantage of the method is the relatively high reflectivity at the interfaces between the metal and the adjacent media, because the reflections produced may lead to various interferences, such as for example contrast reductions, light scattering or signal falsification.

In the case of a layer with an optical thickness of $\lambda_o/4$ the following condition must be satisfied to completely eliminate reflection components.

$$n_2 = \sqrt{\left(\frac{k_3^2}{n_3 - n_1}\right) n_1}$$

wherein:
$n_1$—the refractive index of an absorption-free incident medium,
$n_2$—the refractive index of an absorption-free reflection-reducing layer,
$n_3$—the real portion of the refractive index of the highly reflective material,
$k_3$—the absorption coefficient of the highly reflective material and
$\lambda_o$—the wave length at which the reflection disappears.

The refractive indices resulting from this equation for the coating materials are, however, substantially higher than those available for practical applications.

In order to overcome this objective difficulty, it has already been proposed to provide multiple layers in place of a single coating, which consist, for example, of a plurality of $\lambda_o/4$- and $\lambda_o/2$- layers and the refractive indices of which are adjusted to the optical constants of the highly reflective material and the adjacent medium. The disadvantage of this proposed solution consists of the fact that the effective spectral range is relatively narrow.

SUMMARY OF THE INVENTION

It is therefore the object of the present invention to avoid the disadvantages of the known coatings and to eliminate for a relatively broad spectral range the interfering reflections which occur.

The object is attained according to the invention with a reflection-reducing layer (8) of the above-mentioned type in that the reflection-reducing layer comprises a first and a second substance, wherein the first substance has a refractive index $n_2$ which is equal to or at least approximately equal to $n_1$, and wherein the second substance comprises a strongly absorbing material. The layer(s) can be a single homogeneous layer (total thickness $D \approx n_2 \cdot d_2$) or a sandwich-like laminate (total thickness given by $$D_1 \approx \sum_{x=2}^{l+1} n_x \cdot d_x$$

whereby $l$ is the number of all partial layers) and is structured so that the $\lambda_o/4$ condition is satisfied. The necessary absorption of the reflection-reducing layer is provided by the relative proportions of the two substances. It is possible that the reflection-reducing layer consists of at least two partial coatings. It may be convenient in this regard to provide a first partial layer deposited directly onto the highly reflective surface, consisting of an absorption-free material and having a refractive index $n_2$ with the relationship $n_2 = n_1$ or at least $N_2 \approx n_1$, together with a second partial layer consisting of an absorbent material and arranged on the first partial layer. Advantageously, the first partial layer consists of the same material as the incidence medium, for example, of germanium, and the second partial layer consists of the same material as the highly reflective surface, for example, chromium.

According to a further embodiment of the invention, the reflection-reducing layer may also consist of a homogenous, binary mixture of material, which is composed of a first material corresponding to the incidence medium, and a second material corresponding to the highly reflective surface.

The reflection-reducing layer may further consist of a multiple coating, wherein a first partial layer deposited directly on the highly reflective surface consists of an absorption-free material and has a refractive index $n_2$ with the relationship of $n_2 = n_1$ or $n_2 \approx n_1$ and a second partial layer arranged upon said first partial layer and consisting of an absorbent material follow each other in an alternating sequence, such that in order to achieve the broadest possible range of low reflection at least three partial layers of the absorbent material are provided.

According to a still further embodiment of the invention, the reflection-reducing layer may consist, in the case of an incidence medium of germanium and a highly reflective surface consisting of chromium, of a material mixture with the following composition: 70 to 90% by weight germanium (Ge) and 1 to 30% by weight chromium (Cr). Thus, for a wave length range between 3 and 6 μm, there exists an optimum material mixture of 85% by weight Ge and 15% by weight Cr, while for a wave length range between 8 and 14 μm there is an optimum material mixture of 93.5% by weight Ge and 6.5% by weight Cr.

According to a particularly advantageous embodiment of the present invention, the reflection-reducing layer is arranged between a germanium plate and a chromium mask and consists of five alternating partial layers of germanium and chromium, wherein the first Ge partial layer is arranged directly onto the chromium mask and the last Cr partial layer is arranged directly onto the germanium plate. Advantageously, in this embodiment, the Cr partial layers each have a thickness of 6.5 nm, the Ge partial layers each have a thickness of 110 nm and the chromium mask preferably has a thickness of 200 nm.

According to the invention, the reflection-reducing layer is produced by layer thickness controlled vapor deposition or the simultaneous vapor deposition of the material or material mixture in a high vacuum. It is also possible, however, to apply the material or the material mixture simultaneously or successively by sputtering.

In both cases (vapor deposition in a high vacuum or sputtering), the growth of the layer thickness is controlled by means of an oscillator crystal.

The reflection-reducing layer according to the invention is characterized by a simple layer structure and is prepared easily and reproduceably. With its use, efficient reduction of reflection may be obtained within a broad spectral range, whereby an optimum effect may be achieved by the determination of a suitable mixing ratio of the existing incidence medium and the highly reflecting material in each case by means of planned testing experiments.

BRIEF DESCRIPTION OF THE DRAWINGS

In the drawings, the invention will be explained in more detail with the aid of two schematic diagrams of embodiments as well as a graphical representation. In the drawings.

DETAILED DESCRIPTION OF PREFERRED EMBODIMENTS

Figure 1:
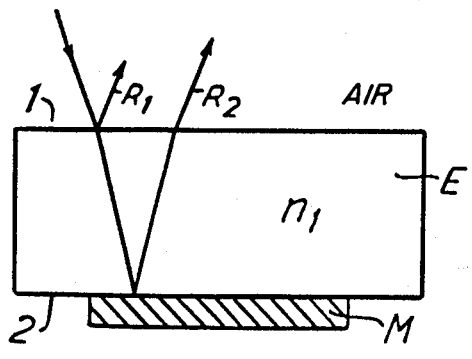
FIG. 1 illustrates the path of the reflecting radiation components in a known arrangement having an incidence medium and a highly reflecting surface without the interposition of a reflection-reducing layer.

In FIG. 1 a plane parallel plate is shown in conventional form which consists of absorption-free material. It shall be designated hereinafter as the incidence medium E, and it has a refractive index of $n_1$.

Its front surface 1 is adjacent to the air; a thin, strongly absorbing metallic layer M is applied directly to its rear surface 2. A beam of light incident in the manner illustrated is reflected in part already by the front surface 1 of the optical incidence medium E. This is indicated schematically in FIG. 1 by the vector $R_1$, which represents a measure of the front surface reflection. The part of the original beam of light penetrating into the incidence medium E is reflected by the interface of the incidence medium E and the strongly absorbing metal layer M, i.e., by the rear surface 2, and passes into the air medium as a rear surface reflection $R_2$. It is seen that the resultant reflection component (approximately $R_1 + R_2$) attains a substantial magnitude with this layer arrangement which does not produce a reduction of the reflection, a fact which shall be discussed in more detail hereinbelow in the description of FIG. 4.

Figure 2:
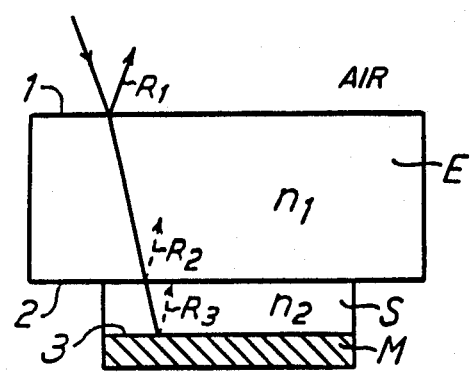
FIG. 2 illustrates the path of the reflected and absorbed radiation components in a first embodiment according to the invention.

FIG. 2 is modified—with respect to FIG. 1—in that between the incidence medium E and the strongly absorbent material M having the highly reflecting surface 3, there is arranged a reflection-reducing layer S having the refractive index $N_2$.

A beam of light incidence on the front surface 1 is reflected—as in FIG. 1—to a certain degree by said front surface; compare the vector $R_1$. This reflection component will not be considered in further explanations of the invention. The portion of the original beam of light penetrating the incidence medium E will be reflected (as longer only as $K_2$ is sufficiently small) to a slight degree by the rear surface 2—compare the vector $R_2$—if the relationship $n_1 <> n_2$ is valid for both refractive indices $n_1$ and $n_2$. In the case of $n_1 = n_2$ or $n_1 \approx n_2$, only a slight reflection or none at all is produced at this interface. The result is that the part of the beam of light penetrating the incidence medium E penetrates into the interior of the reflection-reducing layer S and is reflected by the highly reflective surface 3 of the strongly absorbent layer M—compare the vector $R_3$.

However, in the layer S the portion of the beam of light penetrating into it is absorbed in such a manner that the wave on its way to the rear surface 2—i.e., from the surface 3 in the direction of the surface 2—is attenuated to such a degree that the amplitude is approximately the same as the amplitude of the wave reflected at the interface. Since the amplitudes are relatively small, it is not necessary that they are exactly the same. But the absorbing capability of the layer S may be chosen just large enough to suppress the reflection of the total arrangement, since otherwise the amplitude of the wave reflected on the interface 2 would be larger and thus also the region of lower reflection would be narrower.

As seen in FIG. 2, neither the reflection $R_2$ nor the reflection $R_3$ contributes to an increase in the resultant overall reflection. Rather, the latter merely consists of the reflection $R_1$.

Figure 3:
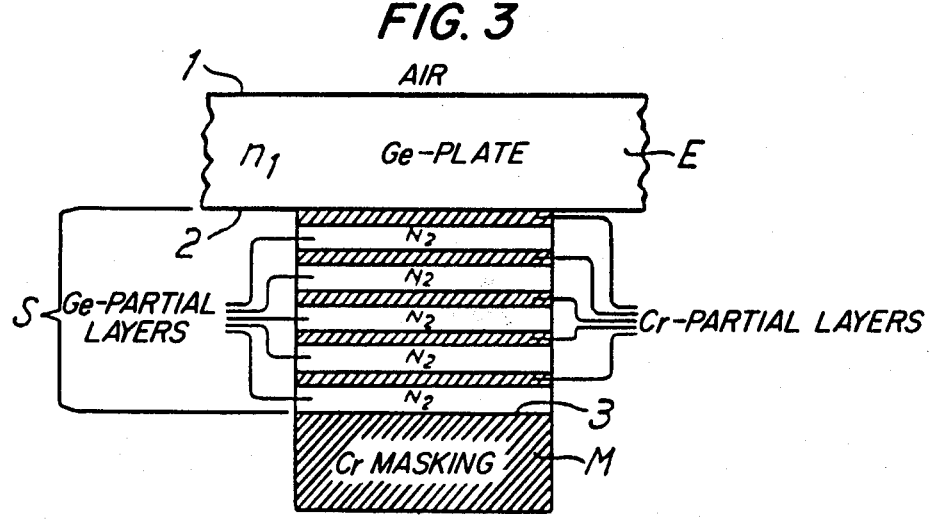
FIG. 3 illustrates a second embodiment of the invention with a sandwich-like multiple reflection-reducing layer.

In FIG. 3, in place of a homogenous reflection-reducing layer S, a reflection-reducing layer consisting of five partial layers is shown. The optimal thickness $D_{10}$ of this layer amounts to $$D_{10} \approx \sum_{x=2}^{11} n_x \cdot d_x,$$

whereby $d_x$ stands for the geometric thickness of the respective partial layers. A plane parallel germanium plate is provided as the incidence medium E. The highly reflective layer consists of a chromium mask M with a thickness of 200 nm. Between the two, there is a multiple layer S, consisting of five germanium partial layers with a refractive index $n_2$—in this case $n_1 = n_2$—and of five chromium partial layers with a thickness of 6.5 nm in an alternating layer sequence, wherein the first partial Ge layer is applied directly on the highly reflecting surface 3 of the chromium mask and the fifth Cr partial layer is applied directly on the rear surface 2 of the Ge plate.

Figure 4:
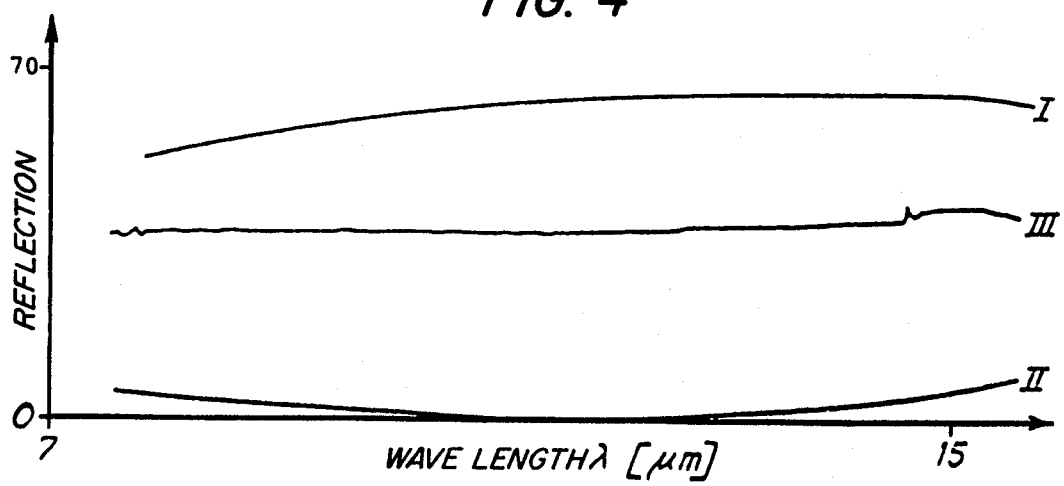
FIG. 4 is a graphical representation from which the degree of the reduction of reflection is ascertainable.

In FIG. 4, the effect of the reduction in reflection is illustrated graphically. On the vertical coordinate axis the reflection is indicated in % and on the horizontal coordinate axis the wave length—namely, with an interval of $\lambda$ between 7 and 15 $\mu$m—is indicated.

Curve I demonstrates the case shown in FIG. 1.

Curve III refers to the layer arrangement shown in FIG. 2. A comparison of the curves I and III already shows a significant reflection-reducing effect.

By means of Curve II the reflectivity of the reflection-reducing germanium layer (the incidence medium E) is demonstrated; however, the front surface reflection $R_1$ is likewise reduced by means of a conventional reflection-reducing layer to a small residual level on the order of 1 or 2%.

The reflection-reducing layer (see FIG. 2) and the individual partial layers of the reflection-reducing multiple layer (see FIG. 3) are vapor-deposited in a high vacuum, wherein the layer thicknesses are controlled with an oscillating crystal instrument. It is, however, also possible to produce the layer or layers according to the invention by means of sputtering. In the case wherein the layer material is a mixture, for example, of Cr and Ge, the reflection-reducing layer may be produced by simultaneous vapor deposition in a manner whereby chromium is vaporized from one crucible and germanium simultaneously from another crucible. But it is also possible to evaporate the pulverized initial mixture (Ge+Cr) from a single crucible and to deposit it in the form of a homogenous mixed layer on the incidence medium, in the present case, germanium.

In addition to germanium, chalcogenides, selenides, silicon and other materials may be considered for the incidence medium E. Strongly absorbing materials M for masks, codings, etc. may consist of metals, alloys, semi-metals, semi-conductors, etc.

Since there are no industrially useful layer materials with reflective indices less than 1.3 (cryolith), the refractive index range for the material of the incidence medium E is limited from a practical standpoint to values of $n_1 > 1.3$.

I claim:

1. An anti-reflection construction, comprising:
an incidence layer of an incidence medium having a refractive index $n_1$ greater than about 1.3 and having a front (incidence) surface and a rear surface;
a reflecting layer of highly reflecting material positioned behind the rear surface of said incidence layer;
a reflection-reducing layer positioned between said incidence layer and said reflecting layer, said reflection-reducing layer comprising first and second components, wherein said first component comprises an absorption-free material having an index of refraction $n_2$ which is equal to or approximately equal to $n_1$, wherein said second component comprises a strongly absorbing material, and wherein said reflection-reducing layer has a thickness such that the $\lambda_o/4$ condition is satisfied, and wherein the relative amounts of said first and second components is selected such that substantially no reflection is produced at the interface between said reflecting layer and said reflection-reducing layer.

2. An anti-reflection construction according to claim 1, wherein said reflection-reducing layer comprises at least two partial layers.

3. An anti-reflection construction according to claim 2, wherein said reflection-reducing layer comprises a first partial layer comprising said non-absorbing material deposited directly onto the highly reflecting surface, and a second partial layer comprising said absorbent material arranged on said first partial layer.

4. An anti-reflection construction according to claim 2, wherein the first partial layer comprises the same material as the incidence medium, and the second partial layer comprises the same material as the highly reflecting surface.

5. An anti-reflection construction according to claim 1, wherein said first partial layer comprises germanium, and said second partial layer comprises chromium.

6. An anti-reflection construction according to claim 3, wherein said reflection-reducing layer comprises a plurality of pairs of said first partial layer and said second partial layer, whereby said first and second partial layers alternate in sequence, and whereby in order to obtain the broadest possible range of low reflection, at least three of said second partial layers of absorbent material are provided.

7. An anti-reflection construction according to claim 1, wherein said reflection-reducing layer comprises a homogenous, binary material mixture, comprised of said first material which is the same as the incidence medium and said second material which is the same as the highly reflecting material.

8. An anti-reflection construction according to claim 7, wherein the incidence medium comprises germanium and the highly reflecting surface comprises chromium, and wherein the binary material mixture comprises the following composition:
70 to 99% by weight Ge
1 to 30% by weight Cr.

9. An anti-reflection construction according to claim 8, wherein the binary material mixture is optimum for a wave length range of 3 to 6 μm and comprises 85% Ge and 15% by weight Cr.

10. An anti-reflection construction according to claim 8, wherein the binary material mixture is optimum for a wave length range between 8 and 14 μm and comprises 93% by weight Ge and 6.5% by weight Cr.

11. An anti-reflection construction according to claim 6, wherein said reflection-reducing layer is arranged between a germanium plate and a chromium mask and comprises five alternating partial layers each of germanium and chromium, wherein the first Ge partial layer is arranged directly on the chromium mask and the last chromium partial layer is arranged directly on the germanium plate.

12. An anti-reflection construction according to claim 11, wherein the Cr partial layers have a thickness of 6.5 nm, the Ge partial layers have a thickness of 110 nm, and the chromium mask has a thickness of 200 nm.

* * * * *